United States Patent [19]
Takahashi et al.

[11] 3,773,708
[45] Nov. 20, 1973

[54] COMPOSITION OF NOVEL MODIFIED FILLER AND RESIN

[75] Inventors: Hiroshi Takahashi, Tokyo; Hiroshi Yui; Takayuki Inoue, both of Yokkaichi, all of Japan

[73] Assignee: Mitsubishi Petrochemical Company, Limited, Tokyo, Japan

[22] Filed: Jan. 21, 1972

[21] Appl. No.: 219,823

[30] Foreign Application Priority Data
Feb. 1, 1971 Japan............................ 46/3717

[52] U.S. Cl.......... 260/41 R, 106/308 Q, 260/41 A, 260/41.5 R, 260/37 EP
[51] Int. Cl. ............................................. C08f 45/04
[58] Field of Search ........... 250/41 A, 41 B, 41.5 R, 250/41 R; 106/308 Q

[56] References Cited
UNITED STATES PATENTS

| | | | |
|---|---|---|---|
| 3,519,593 | 7/1970 | Bolger | 260/41 A |
| 3,471,439 | 10/1969 | Bixler | 106/308 Q |
| 3,590,018 | 6/1971 | Gebura | 260/41 A |
| 3,519,594 | 7/1970 | Michaels | 106/308 Q |
| 3,519,591 | 7/1970 | Bolger | 260/41 A |

*Primary Examiner*—Allan Lieberman
*Assistant Examiner*—P. R. Michl
*Attorney*—Oblon, Fisher & Spivak

[57] ABSTRACT

Filler modified plastic, rubber or thermosetting resin compositions are prepared by admixing a thermoplastic resin, thermo-setting resin or rubber with a modified filler, produced by polymerizing a free radical polymerizable or ionic polymerizable monomer, onto the surface of the filler.

10 Claims, No Drawings

COMPOSITION OF NOVEL MODIFIED FILLER AND RESIN

BACKGROUND OF THE INVENTION

1. Field Of The Invention

This invention relates to filler modified resin compositions and more particularly to the use of novel modified fillers in resin or rubber type compositions.

2. Description Of Prior Art

It has been known that fine powders of various metal oxides, carbonates, silicates, sulfates or silica mineral compounds may be used as fillers for reinforcement of plastic materials or rubbers. However, the surfaces of conventional filler particles are usually hydrophilic which tends to lower their affinity to hydrophobic or lipophilic plastic materials or rubbers, thereby resulting in a comparatively low compatibility mixture.

Moreover, it is usually difficult to disperse conventional filler particles into a resin or rubber matrix by ordinary mechanical means such as kneading, and secondary aggregation of particles often resulted. Heretofore, in order to overcome this disadvantage, it has been proposed to add certain surface active agents to the mix. However, most surface active agents useable for this purpose become mixed into the matrix rather than being adsorbed into the interface between the filler particles and the matrix. Accordingly, a relatively large amount of such surface active agents has been required to achieve a satisfactory distribution of the filler particles which, of course, is quite disadvantageous from the points of view of higher costs and adverse effects on the properties of the matrix.

It is also known that crystalline silica, such as quartz or rock crystal may be admixed with a styrene monomer methacrylic ester monomer, or the like, to modify the surface of the silica. However, such monomers have a rather low affinity for silica, and in subsequent polymerization of the monomer, it is usually homogeneously polymerized with itself and the silica is unaffected. Accordingly, sufficient modification of the surface properties of the silica has not been achieved, nor have the disadvantages of the prior art been overcome.

SUMMARY OF THE INVENTION

Accordingly, it is one object of this invention to provide a composition containing a filler which is characterized by a relatively high affinity for a matrix resin or matrix rubber, and which does not result in secondary aggregation within the matrix.

Another object of this invention is to provide a composition containing a filler which is characterized by a surface having a relatively high affinity for resins or rubbers so as to provide a composition of high mechanical strength, high critical packing volume and good flexibility.

These and other objects, as will hereinafter become more readily apparent, have been attained by admixing a matrix of resin or rubber with a novel modified filler which is produced by admixing crushable particles of an inorganic filler with an ionic polymerizable or free-radical polymerizable monomer, crushing the particles of the inorganic filler so as to branch bond the monomer onto the newly formed surface of the inorganic filler, by a mechano-chemical reaction.

DETAILED DESCRIPTION OF THE PREFERRED EMBODIMENTS

The modified filler used herein is produced by bonding an ionic polymerizable or free-radical polymerizable monomer onto newly formed surfaces of the filler particles. Suitable fillers which may be used for this purpose include the various metal oxides, hydroxides, carbonates, sulfates, silicate, the silicate minerals, or silica minerals. For example, good results are obtainable with titanium oxide, aluminum oxide, ferric oxide, aluminum hydroxide, calcium carbonate, calcium sulfate, barium sulfate, calcium sulfite, calcium silicate, magnesium silicate, talc, mica, sellaite, kaolin, asbestos, zeolite, silica, or the like.

It is also possible to use certain inorganic compounds which alone are not useful as fillers. Where the inorganic particles contain structural water, it is usually desirable to dry the surfaces first to insure that they are not covered with moisture.

Suitable polymerizable monomers used to modify the filler include the vinyl monomers, e.g., acrylic acid, acrylic esters, methacrylic acid, methacrylic esters, styrene, acrylonitrile, acrylamide, and vinylchloride; the $\alpha$-olefins, e.g., ethylene, propylene and butene-1; the dienes, e.g., butadiene and isoprene; the epoxy compounds, e.g., ethylene oxide, propylene oxide, or a wide variety of other ionic polymerizable or free-radical polymerizable monomers.

In preparing the filler particles for modification, they are crushed to provide fresh surfaces in order to increase the area of contact with the monomer. Crushing can be accomplished at temperatures of greater than the melting point of the polymerizable monomer used.

Lower temperatures can be used if the monomer is in the form of a solution in a preferably non-polar solvent.

The particles may be crushed in air or, in some instances, in an inert atmosphere, such as nitrogen, argon, etc. These treatments are most effective if carried out under reduced pressure. It is preferable to apply the operation in a low moisture content atmosphere.

It is possible to mix the polymerizable monomer in the vapor phase with the filler particles, and recycling the monomer vapor through a crusher containing the particles. By this techique, it is possible to use small amounts of the polymerizable monomer as 0.005 percent by weight. It is usually preferred, however, to use the monomer in amounts of greater than 1 percent by weight based on the total weight of composition.

The crushing operation can be conducted by use of any conventional fine crusher, such as a ball mill, vibration mill, pot mill, speed line mill, colloid mill, or the like. Mechanical crushing of the inorganic filler will result in exposing of newly formed surfaces which will momentarily contain active radicals, or ions due to the shear and impact forces which break chemical bonds in the particle. The particular size diameter is reduced in the crushing operation by an average of more than 2 times or by more than 10 times the original diameter.

When an ionic polymerizable or free-radical polymerizable monomer is present, it will be bonded to these active radicals on the particle surfaces, and will be easily polymerized onto these surfaces. Accordingly, a polymer will be formed which is chemically bound to the newly formed surfaces by metal-carbon bonding or by metal-oxygen-carbon bonding to yield the modified filler.

Accordingly, the free-radical polymerizable or ionic polymerizable monomer used should be selected so as to correspond or be compatible with the active radicals or ions formed on the crushed particle surfaces of the filler. Polymerization of the monomer can be promoted by the addition of heat.

A typical example of the preparation of the modified filler using silica as the inorganic filler will now be illustrated. When silica particles are crushed in the polymerizable monomer, the bonds of Si-O-Si of silica are broken to form the active radicals:

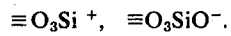

If a polymerizable monomer is present, these active radicals will initiate a polymerization reaction of newly formed surfaces.

Since the formation of newly formed surfaces, and hence, the formation of active radicals, will be promoted by crushing the particles in the presence of other dissimilar particles having different hardnesses and particle sizes, it is often desirable to use a combination of two or more different filler materials.

The matrix used for the composition of this invention can be neutral rubber; synthetic rubber, e.g., butadiene rubber, isoprene rubber, ABS, SBR rubber, chloroprene; poly$\alpha$-olefin, e.g., high density polyethylene, low density polyethylene, polypropylene, polybutene-1; copolymers of $\alpha$-olefins and other monomers; polystyrene; polyvinyl-chloride, polyacrylonitrile, polymethacrylonitrile, and copolymers thereof; nylon, polyesters, polyurethane, and other thermoplastic resins and also thermosetting resins such as phenolic resins, urea resins, melamine resins. The matrix can be admixed with the modified filler by conventional mixing processes. The amount of modified filler can be determined by the particular uses intended so as to meet the requirements of shape, quality and cost.

When the amount of the modified filler is greater than 30 percent, by weight, the composition of filler and thermoplastic resin will have a high bending modulus of elasticity and improved impact strength and will be very effective for use in forming synthetic coarse board or synthetic wood. When the amount of the modified filler is more than 50 percent, by weight, the heat of combustion of the composition will be significantly decreased and the product will easily be combusted in a conventional combustion furnace without damaging the material of the furnace. Moreover, shaped articles having excellent rigidity and low melt-dropping at the time of combustion, can be easily prepared by using the composition of this invention, especially if they contain a large amount of the modified filler. When the amount of the modified filler is less than 30 percent by weight, products having good transparency can be obtained. It is possible to add suitable additives such as anti- oxidants, ultraviolet absorbers, or antielectrostatic agents, to the matrix. These additives can be used in amounts as desired, depending upon the particular end use of the composition. In order to increase compatibility, it is possible to admix a rubber type material, such as an ethylene-propylene type rubber, or styrene-butadiene type rubber, with a thermoplastic resin, such as polyethylene, polypropylene, acrylic resin, and then to admix the modified filler therewith.

A beautiful synthetic board can be prepared by forming a sheet using the resulting composition, and plying one or two printed paper, e.g., a wood pattern which is impregnated with a solution of dibutylphthalate resin or polyester resin on one or both surfaces of the sheet, and then heat-melting them.

In accordance with this invention, a product can be prepared having excellent strength, flexibility and printability, by admixing the matrix with the modified filler. The mechanical properties of the filler of this invention will be the same as those of conventional fillers, and will further be characterized by excellent affinity for plastic material or rubber material matrixes.

It is also possible to prevent the inclusion of air bubbles into the composition, so that a transparent product can be easily obtained. Moreover, even if air bubbles become entrapped in the composition, these air bubbles will be finely dispersed in the matrix and will not be present at the surface of the filler. Bonding between the matrix and the modified filler therefore will not be hindered or prevented by the presence of air bubbles.

The modified filler is covered with the polymer which is bonded onto the surface of the filler. The polymer is also bonded to the non-crystalline region of the resin or rubber matrix so that the mechanical strength of the resulting composition is significantly increased and the compatibility is remarkably improved, as compared with conventional fillers.

The improvement of this invention makes possible a remarkably high critical packing volume, good uniformity and good mechanical strength. at low cost and the modified filler can be easily mixed with the rubber in high uniformity, to provide excellent reinforcement effects. These advantages cannot be obtained by the use of conventional fillers. The modified filler is prepared by the above-mentioned mechano-chemical reaction to bond the polymer resulting from the polymerizable monomer onto the newly formed surface of the filler. The polymer, in turn, has a high affinity for the matrix resin or matrix rubber.

Accordingly, when the modified filler is admixed with the matrix, the surface of the modified filler will be adhered to the matrix and will be highly bonded. The advantages of high compatibility, printability, flexibility, mechanical strength and transparency will thereby be provided.

By combining a plastic material with the relatively low quantity of modified filler, films can be prepared which are useful for packaging, synthetic paper, strips, etc. If a high quantity of filler is used, synthetic coarse board, synthetic wood, molded articles, etc., can be attained. By combining a rubbery material with the modified filler, rubber products having excellent physical properties can be attained with relatively low amounts of modified filler, and plastic products having improved high impact strength can be attained with a relatively high amount of modified filler.

Films having excellent transparency and antiblocking effects can be easily prepared by use of the composition of this invention, especially if it contains only small amounts of the modified filler.

Having generally described the invention, a more complete understanding can be attained by reference to certain specific examples, in which unpredictable effects of the composition of this invention are shown.

EXAMPLE 1

Into a 10 litre pot mill, 500 g. of volcanic pumice having an average particle diameter of $20\mu$, and 200 g. of acrylic acid were charged and crushed at 20°C. for 48 hours in air at the rotation speed of 50 rpm. Most of the unreacted acrylic acid was stripped into the atmosphere and then the crushed product was dried at 80°C. under a pressure of $10^{-1}$ mmHg for 24 hours. 515 g. of the acrylic acid modified volcanic pumice was formed having a particle size diameter of $0.2 - 2\mu$.

According to infrared analysis, it was found that 0.6 percent by weight of the polyacrylic acid was bonded to the filler. The resulting modified filler was admixed and kneaded with polypropylene or high density polyethylene by use of a roller mill.

As shown in Table 1, the modified filler could be mixed in a high ratio because of its generally high compatibility, as compared with the non-modified filler. When the modified filler was used, the time required for kneading was remarkably shortened and the tensile characteristics and bending strength of the composition were remarkably higher as compared with those compositions containing un-modified fillers.

EXAMPLE 2

Into a 10 litre ball mill, 500 g. of calcium carbonate having an average particle diameter of $50\mu$ and 100 g. of methyl methacrylate were charged and crushed at 20°C. for 48 hours in nitrogen atmosphere at the rotation speed of 60 rpm. Most of the unreacted methyl methacrylate was stripped into the atmosphere and then the product was dried at 80°C. under a pressure of $10^{-1}$ mmHg for 24 hours, to yield 515 g. of the methyl methacrylate modified calcium carbonate having an average particle diameter of $0.2\mu$.

According to infrared analysis, it was found that 6.0 percent by weight of polymethyl methacrylate was bonded to the filler. 350 g. of the resulting modified calcium carbonate filler was admixed and kneaded with 125 g. of high density polyethylene and 25 g. of ethylene-propylene terpolymer by using a roller mill, and was formed into a sheet. When the modified filler was used, the time required for kneading was considerably shortened and the bending modulus of elasticity was remarkably increased as compared with the same composition containing un-modified fillers, as shown in Table 2.

EXAMPLE 3

Into a 10 litre vibration ball mill, 500 g. of calcium sulfate having an avarage particle diameter of $30\mu$ and 500 g. of vinylchloride monomer were charged and crushed at 20°C. in a nitrogen atmosphere for 72 hours. Most of the unreacted vinylchloride monomer was stripped into the atmosphere, and then the product was dried at 80°C. under a pressure of $10^{-1}$ mmHg for 24 hours, to yield 510 g. of vinylchloride modified calcium sulfate having an average particle diameter of $0.25\mu$.

According to infrared analysis, it was found that 1.8 percent by weight of polyvinylchloride was bonded to the calcium sulfate. The resulting modified filler was admixed and kneaded with the plastic material as shown in Table 3, by use of a roller mill, and was formed into a sheet. When the modified filler was used, the time required for kneading was considerably shortened and the tensile characteristics was remarkably increased as compared with the same composition using un-modified filler, as shown in Table 4.

EXAMPLE 4

Into a 10 litre pot mill, 500 g. of natural zeolite made of main components of mordenite having an average particle diameter of $10\mu$ and 100 g. of acrylonitrile were charged and crushed at 10°C. in a nitrogen atmosphere for 72 hours at the rotation speed of 30 rpm. Most of the unreacted acrylonitrile was stripped into the atmosphere, and the product was dried at 80°C. under a pressure of $10^{-1}$ mmHg for 24 hours in vacuum, to yield 510 g. of the acrylonitrile modified mordenite having an average particle diameter of $0.3\mu$.

According to infrared analysis, it was found that 3.3 percent by weight of polyacrylonitrile was bonded to the mordenite.

The resulting modified filler was admixed and kneaded with plastic materials as shown in Table 5, by use of a roller mill, and was formed into a sheet. When a modified filler was used, the tensile strength and tear strength were significantly higher as compared with those of the same composition containing an un-modified filler, as shown in Table 6.

TABLE 1

| Composition | | | | | Compatibility time for kneading,* minutes | Tensile characteristics** | | Bending characteristics** | |
|---|---|---|---|---|---|---|---|---|---|
| Polymer | Wt. percent | Filler | Diameter of particle | Wt. percent | | Tensile strength, kg./cm.² | Ultimate elongation, percent | Bending strength, kg./cm.² | Bending modulus of elasticity, kg./cm.² |
| Polypropylene*** | 50 | Acrylic acid modified | 0.2-2μ | 50 | 11.0 | 332 | 15 | 540 | 36,500 |
| Do | 40 | do | 0.2-2μ | 60 | 12.0 | 210 | 10 | 540 | 40,500 |
| Do | 30 | do | 0.2-2μ | 70 | 14.5 | 182 | 8 | 590 | 59,600 |
| Do | 20 | do | 0.2-2μ | 80 | 17.0 | 136 | 5 | 620 | 87,000 |
| Do | 50 | Non-treated | 0.2-2μ | 50 | 18.5 | 200 | 9 | 440 | 31,000 |
| Do | 40 | do | 0.2-2μ | 60 | 20.5 | 142 | 3 | 440 | 40,000 |
| Do | 30 | do | 0.2-2μ | 70 | 24.0 | 96 | 2 | 470 | 62,000 |
| Do | 20 | do | 0.2-2μ | 80 | Incompatible | | | | |
| High density polyethylene**** | 50 | Acrylic acid modified | 0.2-2μ | 50 | 10.5 | 349 | 18 | 420 | 30,000 |
| Do | 40 | do | 0.2-2μ | 60 | 11.5 | 195 | 12 | 503 | 45,200 |
| Do | 30 | do | 0.2-2μ | 70 | 14.0 | 150 | 8 | 575 | 55,300 |
| Do | 20 | do | 0.2-2μ | 80 | 17.0 | 120 | 6 | 410 | 67,700 |
| Do | 50 | Non-treated | 0.2-2μ | 50 | 18.0 | 241 | 8 | 410 | 29,600 |
| Do | 40 | do | 0.2-2μ | 60 | 20.5 | 170 | 4 | 440 | 40,500 |
| Do | 30 | do | 0.2-2μ | 70 | 24.0 | 130 | 3 | 470 | 55,100 |
| Do | 20 | do | 0.2-2μ | 80 | Incompatible | | | | |

*Time required for uniformly dispersing the filler by appearance by kneading 0.5 kg. of the composition on a roller mill.
**0.5 mm. sheet of the composition was used.
***Polypropylene having 96 wt. percent of boiling n-heptane insoluble component and 4.0 of melt index was used.
****High density polyethylene having a melt index of 1.8 and a specific gravity of 0.961 was used.

TABLE 2

| Filler | Average diameter of particle | Characteristics of composition | |
|---|---|---|---|
| | | Compatibility ** Time for kneading | Bending *** modulus of elasticity |
| Methylmethacrylate modified $CaCO_3$ | 0.2μ | 12.0 min. | 50,000 kg/cm² |
| Non-modified $CaCO_3$ | 0.2μ | 21.0 min. | 41,000 kg/cm² |

* The composition is as follows:
High density of polyethylene  25 wt.%
(Melt index 1.5 ; Specific gravity 0.961)
Ethylene-propylene terpolymer  5 wt.%
Mooney viscosity 4.7
Propylene content 42%
Double bond component 2.7%
Filler  70 wt.%
** Time required for uniformly dispersing the filler in appearance, by kneading 0.5 kg. of the composition on a roller mill.
*** 0.5 mm.sheet of the composition is used.

TABLE 3

| | |
|---|---|
| Polyvinylchloride | 100 parts by weight |
| Dibutylphthalate | 2 " |
| Zinc stearate | 2 " |
| Styrene-butadiene rubber | 5 " |
| Filler | 80 " |

TABLE 4

| Filler | Vinylchloride modified $CaSO_4$ | Non-modified $CaSO_4$ |
|---|---|---|
| Average Diameter of particle | 1μ | 1μ |
| Charact. Compatibility * of Time for kneading | 9 min. | 13 min. |
| Comp. Tensile strength ** | 170 kg/cm² | 150 kg/cm² |
| Ultimate elongation ** | 250 % | 180 % |

* Time required for uniformly dispersing the filler in appearance by kneading 0.5 kg. of the composition on a roller mill.
** 0.5 mm. sheet of the composition is used.

TABLE 5

| | |
|---|---|
| Ethylene-propylene terpolymer Mooney viscosity 50 : proplene content 40% double bond content 1.3% | 100 parts by weight |
| Zinc oxide | 2 " |
| Filler | 50 " |
| Aromatic processing oil | 10 " |
| Vulcanizing accelerator | 3 " |
| Sulphur | 1.3 " |

TABLE 6

| Filler | Acrylonitrile modified mordenite | Non-modified mordenite |
|---|---|---|
| Average Diameter of Particle | 0.3μ | 0.3μ |
| Compatibility Time * Charact. for kneading | 15 min. | 20 min. |
| of Tensile strength Comp. (300%) ** | 189 kg/cm² | 142 kg/cm² |
| 300% Tensile strength | 40 kg/cm² | 28 kg/cm² |
| Ultimate elongation ** | 720 % | 800 % |
| Ultimate strength ** | 40 kg/cm² | 28 kg/cm² |

* Time required for uniformly dispersing the filler in appearance by kneading 0.5 kg.of the composition on a roller mill.
** 0.5 mm. sheet of the composition is used.

EXAMPLE 5

The composition prepared in Example 2 was formed into a shaped board. A printed paper having the simulated pattern of the grain of wood was impregnated with dibutylphthalate and was plied onto the board and was heat-pressed to yield a synthetic wood of beautiful appearance.

EXAMPLE 6

Into a 10 litre vibration ball mill, 500 g. of silica having an average particle diameter of 24μ was admixed with 500 ml. of 20 wt. percent of lauryl methacrylate in n-hexane and the mixture was crushed at 20°C. for 72 hours in air. The reaction product was washed with n-hexane, several times, to remove unreacted lauryl methacrylate, and was dried at 150°C. under a pressure of $10^{-1}$ mmHg for 24 hours, to yield a modified fine silica, having an average particle diameter of 0.25μ.

According to infrared analysis, 0.5 wt. percent of polymethacrylate was bonded to the silica. An unmodified silica was prepared by crushing the same silica in n-hexane in the absence of lauryl methacrylate. The composition having the formula shown in Table 7 containing polypropylene and the silica, was melt-extruded at a die temperature of 220°C. using a single blade extruder to yield granules.

The granular composition was shaped at 230°C. by using an inflation-film extruder having a diameter of 45 mm. to yield a tubular film having a thickness of 30μ. A film containing the lauryl methacrylate modified silica was found to have superior transparency (cloudiness) than that obtained when using un-modified silica.

TABLE 7

| | |
|---|---|
| Polypropylene | 100 parts by weight |
| 3,5-di-tert-butyl,4-methyphenol | 0.1 " |
| tetrakis [methylene-3(3,5-di-tert-butyl 4-hydroxyphenyl)propanoate]methane | 0.05 " |
| erucinic amide | 0.08 " |
| calcium stearate | 0.05 " |
| fine silica powder | 0.1 " |

TABLE 8

| Type of fine silica | Film mechanical property | | |
|---|---|---|---|
| | Cloudiness | Brocking Degree | Coefficient of static friction |
| lauryl methacrylate modified silica | 1.9% | g/10cm 280 | 0.18 |
| non-modified silica | 4.1% | 280 | 0.18 |

Having now fully described the invention, it will be apparent to one of ordinary skill in the art that many changes and modifications can be made thereto without departing from the spirit or scope of the invention. Accordingly,

What is claimed as new and desired to be covered by letters patent is:

1. A method for forming a filler resin or rubber composition which comprises:
   crushing an inorganic filler wherein the filler is reduced in size by an average of more than 10 time the original diameter in the presence of a free radical polymerizable or ionic polymerizable monomer whereby the monomer is polymerized and is bonded to the newly formed surfaces of the crushed filler to form a modified filler, whereby said bonding is free radical bonding when said monomer is a free radical polymerizable monomer and is ionic bonding when said monomer is an ionic polymerizable monomer,
   and admixing said modified filler into a matrix of a thermoplastic resin, thermosetting resin or rubber.

2. The process of claim 1, wherein the crushing is conducted at a temperature of higher than the melting point of the polymerizable monomer.

3. The process of claim 1, wherein the crushing is conducted in a solution of the monomer in an organic solvent.

4. The process of claim 1, wherein the radical polymerization or ionic polymerizable monomer is used in amounts of greater than 0.005 percent by weight of the filler.

5. The process of claim 1, wherein the modified filler is used in an amount of less than 30 percent by weight based on the total weight of the composition.

6. The process of claim 1, wherein the modified filler is used in an amount of more than 30 percent by weight based on the total weight of the composition.

7. The process of claim 1, wherein the modified filler is used in an amount of more than 50 percent by weight based on the total weight of the composition.

8. The process of claim 1, wherein two or more inorganic fillers, each having different hardnesses and particle sizes, are mutually crushed in the presence of the polymerizable monomer.

9. The process of claim 1, wherein said inorganic filler is selected from the group consisting of calcium carbonate, magnesium carbonate, calcium sulfate, sodium carbonate, and dolomite.

10. The process of claim 1 wherein the crushing is made in a substantially moisture-free environment.

* * * * *